(12) United States Patent
Xi et al.

(10) Patent No.: US 11,848,609 B2
(45) Date of Patent: *Dec. 19, 2023

(54) CONTROL CIRCUIT AND METHOD FOR SWITCHING POWER CONVERTERS

(71) Applicant: M3 Technology Inc., Taipei (TW)

(72) Inventors: Xiaoyu Xi, Dallas, TX (US); Bo Yang, Allen, TX (US)

(73) Assignee: M3 Technology, Inc., Taipei (TW)

(*) Notice: Subject to any disclaimer, the term of this patent is extended or adjusted under 35 U.S.C. 154(b) by 45 days.

This patent is subject to a terminal disclaimer.

(21) Appl. No.: 17/712,460

(22) Filed: Apr. 4, 2022

(65) Prior Publication Data

US 2022/0224234 A1 Jul. 14, 2022

Related U.S. Application Data

(60) Continuation of application No. 16/885,492, filed on May 28, 2020, now Pat. No. 11,303,213, which is a division of application No. 16/536,770, filed on Aug. 9, 2019, now Pat. No. 10,778,102, which is a continuation of application No. 16/011,117, filed on Jun. 18, 2018, now Pat. No. 10,418,907.

(51) Int. Cl.
*H02M 3/156* (2006.01)
*H02M 3/335* (2006.01)
*H02M 1/08* (2006.01)
*H02M 1/00* (2006.01)
*H02M 3/158* (2006.01)

(52) U.S. Cl.
CPC ......... *H02M 3/156* (2013.01); *H02M 1/0003* (2021.05); *H02M 1/08* (2013.01); *H02M 3/158* (2013.01); *H02M 3/33507* (2013.01); *H02M 1/0025* (2021.05); *H02M 1/0032* (2021.05)

(58) Field of Classification Search
CPC .. H02M 3/156; H02M 1/0025; H02M 1/0003; H02M 3/158
See application file for complete search history.

(56) References Cited

U.S. PATENT DOCUMENTS

| | | |
|---|---|---|
| 3,313,955 A | 4/1967 | Brisay, Jr. |
| 10,122,280 B1 | 11/2018 | Vaananen et al. |
| 10,418,907 B1 | 9/2019 | Xi et al. |
| 2009/0174383 A1 | 7/2009 | Tsui et al. |
| 2009/0231889 A1 | 9/2009 | Saint-Pierre |
| 2010/0033215 A1 | 2/2010 | Fogg et al. |
| 2015/0008895 A1 | 1/2015 | Weng et al. |
| 2015/0188430 A1 | 7/2015 | Yuan |
| 2016/0315538 A1 | 10/2016 | Nguyen et al. |

(Continued)

*Primary Examiner* — Harry R Behm
(74) *Attorney, Agent, or Firm* — AP3 Law Firm PLLC

(57) ABSTRACT

An apparatus includes a first conversion unit configured to convert a ramp voltage signal into a ramp current signal flowing through a first resistor, a second conversion unit configured to convert a feedback voltage signal into a feedback current signal flowing through the first resistor, a third conversion unit configured to convert a control voltage signal generated by an error amplifier into a control current signal flowing through a second resistor, and a comparator having a first input coupled to the first resistor and a second input coupled to the second resistor, wherein an output of the comparator determines a turn-on of a high-side switch of a power converter.

19 Claims, 11 Drawing Sheets

(56) References Cited

U.S. PATENT DOCUMENTS

2017/0070141 A1 3/2017 Mahmoudi et al.
2017/0331370 A1* 11/2017 Arbetter ............... H02M 3/156
2019/0013732 A1 1/2019 Childs et al.

* cited by examiner

CONTROL CIRCUIT AND METHOD FOR SWITCHING POWER CONVERTERS

PRIORITY CLAIM AND CROSS-REFERENCE

This application is a continuation of U.S. application Ser. No. 16/885,492, filed on May 28, 2020, entitled "Control Circuit and Method for Switching Power Converters", which is a divisional of U.S. application Ser. No. 16/536,770, filed on Aug. 9, 2019, entitled "Control Circuit and Method for Switching Power Converters", now U.S. Pat. No. 10,778,102 issued Sep. 15, 2020, which is a continuation of U.S. application Ser. No. 16/011,117, filed on Jun. 18, 2018, entitled "Control Circuit and Method for Switching Power Converters", now U.S. Pat. No. 10,418,907 issued Sep. 17, 2019, each application is hereby incorporated herein by reference.

TECHNICAL FIELD

The present invention relates to a control scheme of a power converter, and, in particular embodiments, to a power converter employing a constant on-time control scheme.

BACKGROUND

As technologies further advance, a variety of electronic devices, such as mobile phones, tablet PCs, digital cameras, MP3 players and/or the like, have become popular. Each electronic device requires direct current power at a substantially constant voltage which may be regulated within a specified tolerance even when the current drawn by the electronic device may vary over a wide range. In order to maintain the voltage within the specified tolerance, a power converter (e.g., a switching dc/dc converter) coupled to the electronic device provides very fast transient responses, while keeping a stable output voltage under various load transients.

Hysteretic-based power converter control schemes such as the constant on-time scheme can enable power converters to provide fast transient responses. A buck converter employing the constant on-time control scheme may only comprise a feedback comparator and an on-timer. In operation, the feedback circuit of the power converter (e.g., buck converter) directly compares a feedback signal with an internal reference. When the feedback signal falls below the internal reference, the high-side switch of the power converter is turned on and remains on for the on-timer duration. As a result of turning on the high side switch, the inductor current of the power converter rises. The high-side switch of the power converter turns off when the on-timer expires, and does not turn on until the feedback signal falls below the internal reference again. In summary, when the constant on-time control scheme is employed in a power converter, the on-time of the high-side switch of the power converter is terminated by the on-timer. The off-time of the high-side switch of the power converter is terminated by the feedback comparator.

The power converters employing the constant on-time control scheme are simple to design. However, the constant on-time control scheme has an unwanted instability issues such as a sub-harmonic oscillation at the output voltage. The sub-harmonic oscillation may be caused by insufficient ESR (equivalent series resistance) of the output capacitor. The sub-harmonic oscillation may generate an excessive ripple voltage at the output of the power converter. Such an excessive ripple voltage is not preferable in many applications.

In order to avoid the sub-harmonic oscillation, a voltage ramp is injected into the feedback circuit to solve this instability issue. The voltage ramp may be implemented as an internal ramp such as a sensed current signal or an external ramp such as a voltage ramp generated by charging a ramp capacitor with a constant current source.

The voltage ramp has a significant impact on the operation of the power converter. More particularly, a large ramp signal is able to improve the stability of the power converter. On the other hand, a small ramp signal helps to improve the transient response of the power converter.

The ramp signal may be injected into the control loop of the power converter through adding the ramp signal and the feedback signal directly at a feedback input of an error amplifier. However, directly injecting the ramp signal into the control loop may cause some undesirable effects such as an input offset of the error amplifier and the like.

It would be desirable to provide an apparatus and/or a method for separating the ramp signal from the feedback signal so as to achieve both stable operations and fast transient responses under a variety of operating conditions.

SUMMARY

In particular embodiments, a control scheme may achieve fast transient responses and improve the performance of a hysteretic-based power converter under a variety of operating conditions.

In accordance with an embodiment, an apparatus comprises a first conversion unit configured to convert a ramp voltage signal into a ramp current signal flowing through a first resistor, a second conversion unit configured to convert a feedback voltage signal into a feedback current signal flowing through the first resistor, a third conversion unit configured to convert a control voltage signal generated by an error amplifier into a control current signal flowing through a second resistor, and a comparator having a first input coupled to the first resistor and a second input coupled to the second resistor, wherein an output of the comparator determines a turn-on of a high-side switch of a power converter.

In accordance with another embodiment, an apparatus comprises a first adjustable gain conversion unit configured to convert a ramp voltage signal into a ramp current signal flowing through a first resistor, a second adjustable gain conversion unit configured to convert a feedback voltage signal into a feedback current signal flowing through the first resistor, a third adjustable gain conversion unit configured to convert a control voltage signal generated by an error amplifier into a control current signal flowing through a second resistor, and a comparator having a first input coupled to the first resistor and a second input coupled to the second resistor, wherein an output of the comparator determines a turn-on of a high-side switch of a power converter.

In accordance with yet another embodiment, a converter comprises a high-side switch and a low-side switch connected in series between an input power source and ground, an inductor connected between a common node of the high-side switch and the low-side switch, and an output capacitor, and a control apparatus comprising a first conversion unit configured to convert a ramp voltage signal generated by a ramp generator into a ramp current signal flowing through a first resistor, a second conversion unit configured to convert a feedback voltage signal into a feedback current signal flowing through the first resistor, a third conversion unit configured to convert a control voltage signal generated by an error amplifier into a control current signal flowing through a second resistor, and a comparator having a first input coupled to the first resistor and a second input coupled to the second resistor, wherein an output of the comparator determines a turn-on of the high-side switch of a power converter.

An advantage of a preferred embodiment of the present disclosure is improving a power converter's performance through separating the ramp signal from the feedback signal at the feedback node of the power converter and injecting the ramp signal into the feedback loop via a summing stage.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a power converter having a summing stage for injecting a ramp signal into a control loop of the power converter. The invention may also be applied, however, to a variety of power converters. Hereinafter, various embodiments will be explained in detail with reference to the accompanying drawings.

Figure 1:
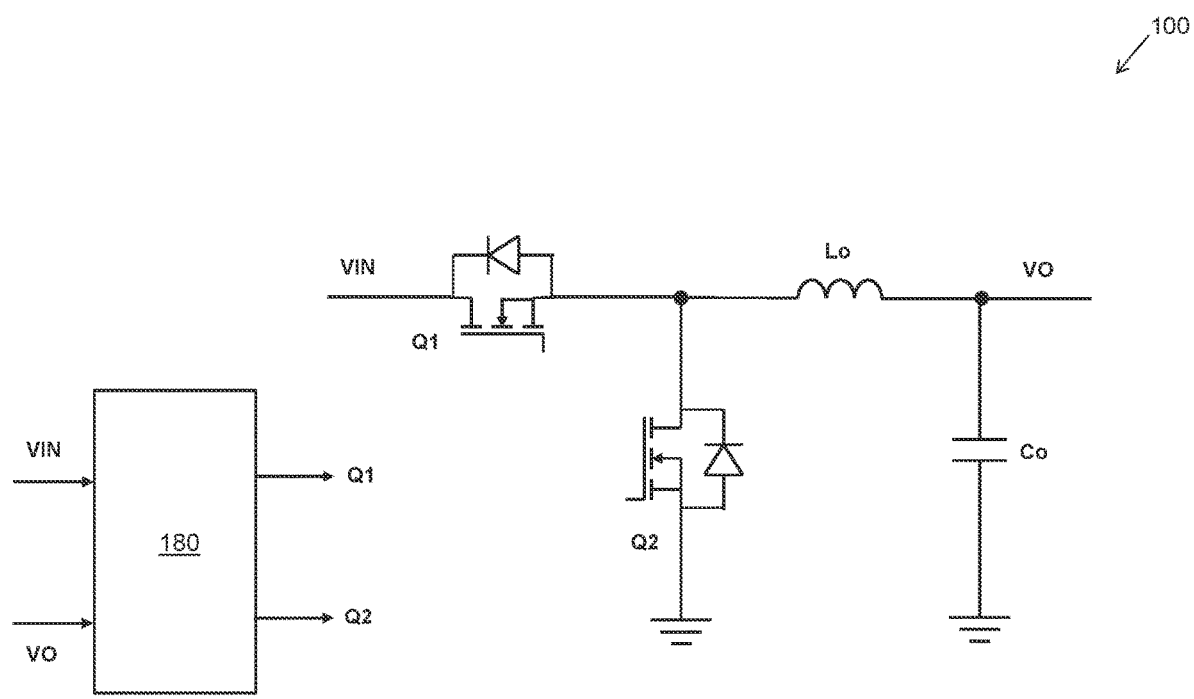
FIG. 1 illustrates a block diagram of a control apparatus of a power converter in accordance with various embodiments of the present disclosure.

FIG. 1 illustrates a block diagram of a control apparatus of a power converter in accordance with various embodiments of the present disclosure. The power converter 100 is a step-down power converter (also known as a buck converter). The operation of the power converter 100 is controlled by a control apparatus 180.

As shown in FIG. 1, the power converter 100 includes a first switch Q1, a second switch Q2, an inductor Lo and an output capacitor Co. As shown in FIG. 1, the first switch Q1 and the second switch Q2 are connected in series between an input power source VIN and ground. The inductor Lo is connected between the common node of the first switch Q1 and the second switch Q2, and the output capacitor Co. Throughout the description, the first switch Q1 may be alternatively referred to as a high-side switch of the power converter 100. Likewise, the second switch Q2 may be alternatively referred to as a low-side switch of the power converter 100.

In some embodiments, the power converter 100 is implemented as a constant on-time power converter. In alternative embodiments, the power converter 100 may be implemented as other suitable power converters such as a constant off-time power converter. Furthermore, the constant on-time control is merely an example. A person skilled in the art would understand, depending on different applications and design needs, other suitable control mechanisms may be applicable to the power converter 100.

The first switch Q1 and the second switch Q2 are implemented as n-type transistors as shown in FIG. 1. The gate of the first switch Q1 and the gate of the second switch Q2 are controlled by a control apparatus 180.

It should be noted that the power converter 100 shown in FIG. 1 is merely an example, which should not unduly limit the scope of the claims. One of ordinary skill in the art would recognize many variations, alternatives, and modifications. For example, the first switch Q1 may be implemented as a p-type transistor. Furthermore, the switch of the power converter 100 (e.g., the first switch Q1) may be implemented as a plurality of n-type transistors connected in parallel.

In some embodiments, the control apparatus 180 may apply a constant on-time control scheme to the power converter 100. In addition, under different operation conditions, the control apparatus 180 may apply a ramp to the feedback control circuit so as to achieve stable operations and fast transient responses. More particularly, the control apparatus 180 may comprise a summing stage through which the ramp is injected into the feedback control circuit. By employing the summing stage, the feedback signal and the ramp are not added directly at the input of the error amplifier of the feedback control circuit. Instead, the feedback signal and the ramp are two separate signals and added together through the summing stage.

As shown in FIG. 1, the control apparatus 180 is configured to receive the input voltage VIN and the output voltage Vo. Based upon the output voltage Vo and/or the input voltage VIN, the control apparatus 180 generates two gate signals for controlling the operation of the power converter 100. The detailed operation of the control apparatus 180 will be described below with FIGS. 2-9.

Figure 2:
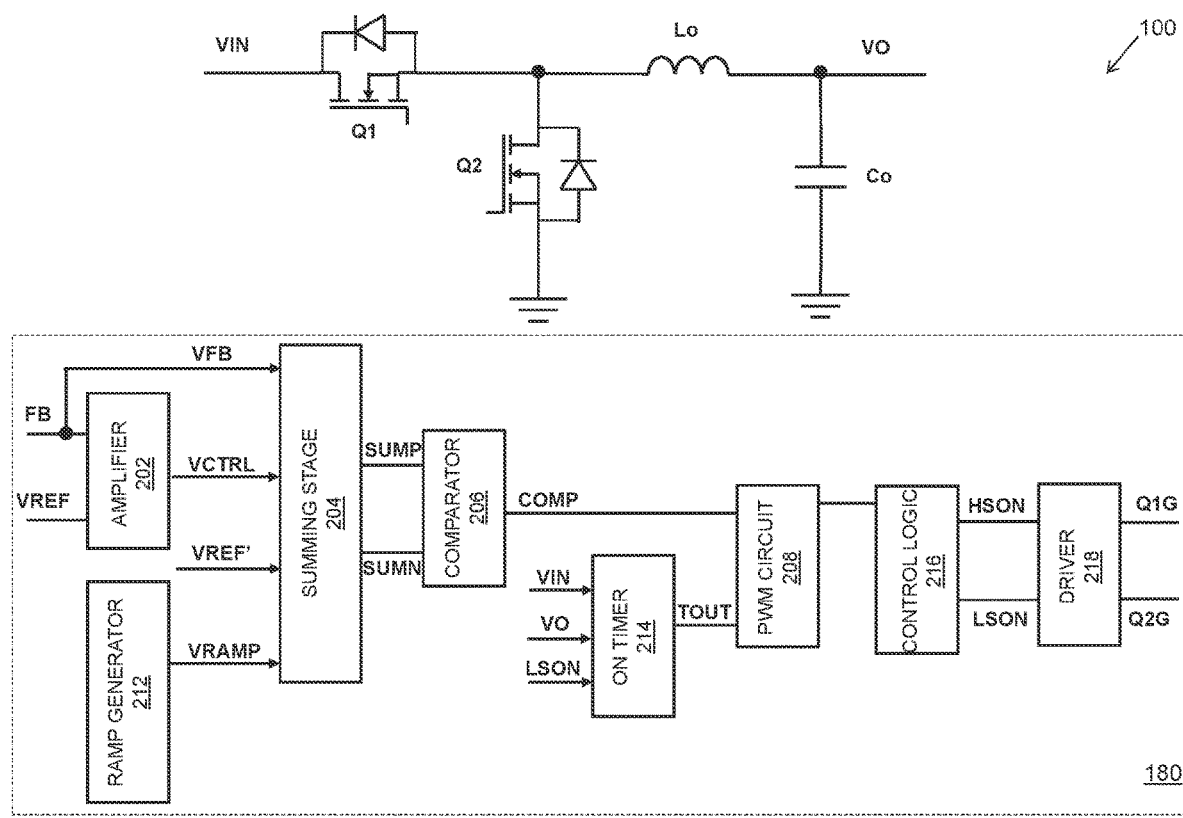
FIG. 2 illustrates a detailed block diagram of a first implementation of the control apparatus of the power converter shown in FIG. 1 in accordance with various embodiments of the present disclosure.

FIG. 2 illustrates a detailed block diagram of a first implementation of the control apparatus of the power converter shown in FIG. 1 in accordance with various embodiments of the present disclosure. The control apparatus 180 of the power converter 100 comprises an amplifier apparatus 202, a ramp generator 212, a summing stage 204, a comparator apparatus 206, an on-time control apparatus 214, a pulse width modulation (PWM) circuit 208, a control logic apparatus 216 and a driver apparatus 218.

The amplifier apparatus 202 is used to monitor the output voltage of the power converter 100. The input signal FB of the amplifier apparatus 202 is a signal proportional to the output voltage of the power converter 100. The input signal REF of the amplifier apparatus 202 is a predetermined reference voltage.

The summing stage 204 has four inputs and two outputs. As shown in FIG. 2, the summing stage 204 has a first input configured to receive a ramp signal VRAMP, a second input configured to receive a feedback signal VFB, a third input configured to receive an output signal VCTRL of the amplifier apparatus 202 and a fourth input configured to receive a reference signal VREF'. Throughout the description, VCTRL is alternatively referred to as a control signal VCTRL.

The ramp signal VRAMP is generated by the ramp generator 212. The detailed structure of the ramp generator 212 will be described below with respect to FIG. 3. The feedback signal VFB is a signal proportional to the output voltage of the power converter 100. The reference signal VREF' is proportional to the reference VREF.

In some embodiments, the reference signal VREF' is equal to k times the reference VREF where k is in a range from 0 to 1. The output signal VCTRL is equal to a value in the vicinity of (1-k) times the reference VREF. One advantageous feature of having the combination of the reference signal VREF' and the output signal VCTRL above is the output signal VCTRL of the amplifier apparatus 202 only needs to have a small dynamic range to fully regulate the power converter 100. The detailed structure of the summing stage 204 will be described below with respect to FIGS. 3-5.

The on-time control apparatus 214 has three inputs and one output. As shown in FIG. 2, the on-time control apparatus 214 receives the input voltage VIN, the output voltage Vo and the low-side gate drive signal LSON. Based upon the received signals, the on-time control apparatus 214 generates a signal TOUT, which is fed into the PWM circuit 208.

According to the operating principle of constant on-time power converters, the comparator apparatus 206 is employed to turn on the high-side switch Q1 when the detected output voltage is below a predetermined reference (e.g., VREF in FIG. 2). More particularly, the turn-on signal of the high-side switch Q1 is generated through applying a logic high signal to a first input of the PWM circuit 208 (e.g., a set input of a latch). After the high-side switch Q1 has been turned on, the turn-off of the high-side switch Q1 is determined by the on-time control apparatus 214. The turn-off signal of the high-side switch Q1 is generated through applying a logic high signal to a second input of the PWM circuit 208 (e.g., a reset input of a latch).

The control logic apparatus 216 has an input connected to an output of the PWM circuit 208. In some embodiments, the control logic apparatus 216 is employed to generate the high-side drive signal and the low-side drive signal based upon the output signal/signals of the PWM circuit 208. Furthermore, the control logic apparatus 216 may be used to produce special features for the high-side drive signal and the low-side drive signal. For example, the control logic apparatus 216 may insert small amount of time between the high-side drive signal and the low-side drive signal. The small amount of time is known as the dead-time between the high-side drive signal and the low-side drive signal.

The control logic apparatus 216 has two outputs. A first output provides a gate drive signal for the high-side switch Q1. The first output signal of the control logic apparatus 216 is defined as HSON as shown in FIG. 2. A second output provides a gate drive signal for the low-side switch Q2. The second output signal of the control logic apparatus 216 is defined as LSON as shown in FIG. 2.

The driver apparatus 218 is employed to provide high speed and high current drive capability for the power converter 100. In some embodiments, the driver apparatus 218 may further comprise a level-shifting circuit for driving an n-channel high-side switch (e.g., the high-side switch Q1).

The driver apparatus 218 has two outputs. A first output is connected to the gate of the high-side switch Q1. The first output signal of the driver apparatus 218 is defined as Q1G as shown in FIG. 2. A second output is connected to the gate of the low-side switch Q2. The second output signal of the driver apparatus 218 is defined as Q2G as shown in FIG. 2.

Figure 3:
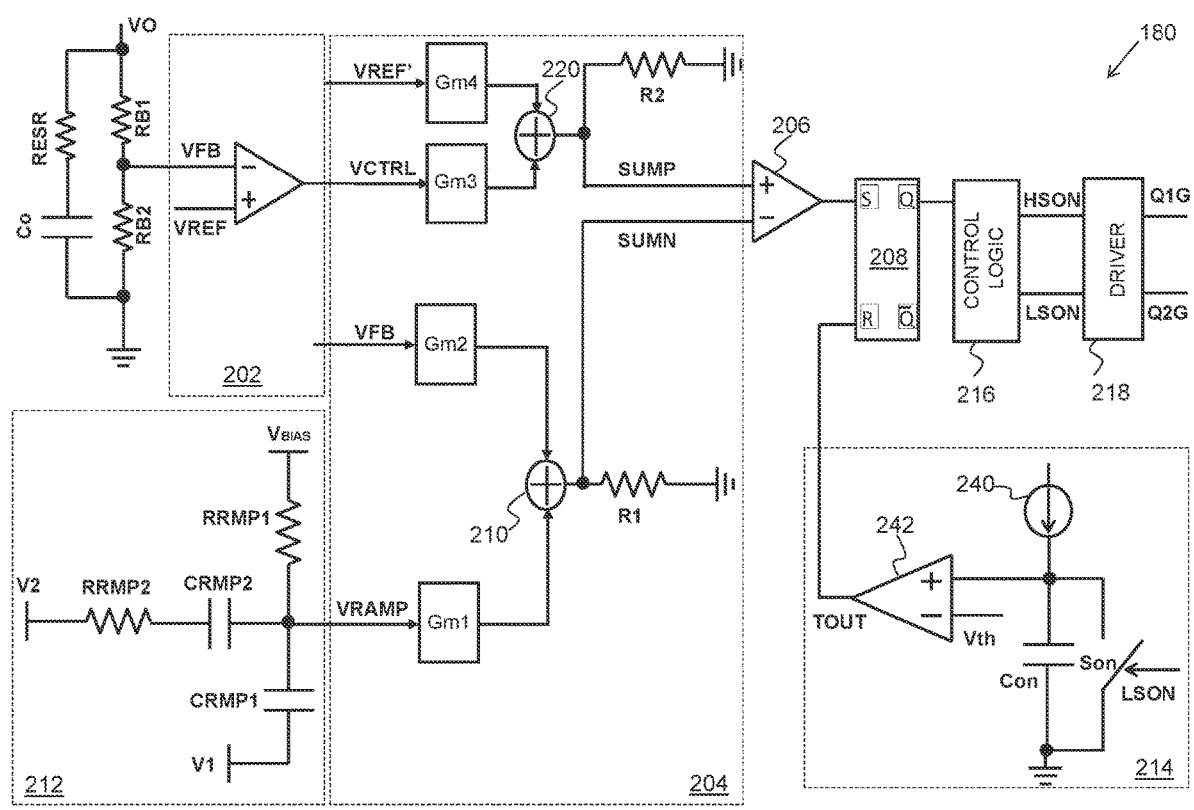
FIG. 3 illustrates a schematic diagram of the control apparatus shown in FIG. 2 in accordance with various embodiments of the present disclosure.

FIG. 3 illustrates a schematic diagram of the control apparatus shown in FIG. 2 in accordance with various embodiments of the present disclosure. The control apparatus 180 comprises the amplifier apparatus 202, the ramp generator 212, the summing stage 204, the comparator apparatus 206 and the on-time control apparatus 214. As shown in FIG. 3, the amplifier apparatus 202 is implemented as an error amplifier. Throughout the description, the amplifier apparatus 202 is alternatively referred to as the error amplifier 202.

The non-inverting input of the error amplifier 202 is configured to receive a predetermined reference VREF. In some embodiments, the predetermined reference VREF is equal to 0.8 V. The reference VREF has a predetermined value (e.g., 0.8 V). Depending on different applications and design needs, the reference VREF may vary accordingly.

As shown in FIG. 3, an inverting input of the error amplifier 202 is connected to a voltage divider formed by resistors RB1 and RB2. More particularly, the inverting input of the error amplifier 202 is connected to a common node of resistors RB1 and RB2.

The output capacitor Co may be implemented as a low-ESR ceramic capacitor. In some embodiments, the capacitance of the output capacitor Co is in a range from about 1 uF to about 10 uF. The ESR of the output capacitor Co is in a range from about 1 milliohm to about 10 milliohms. In some embodiments, a feedforward capacitor (not shown) may be placed in parallel with RB1 to further improve the transient response of the power converter.

It should be noted that the error amplifier shown in FIG. 3 is selected purely for demonstration purposes and are not intended to limit the various embodiments of the present disclosure to any particular amplifiers. One of ordinary skill in the art would recognize many variations, alternatives, and modifications. For example, the amplifier apparatus 202 may comprise a trans-conductance amplifier and a compensation network.

The ramp generator 212 comprises a first ramp resistor RRMP1, a first ramp capacitor CRMP1, a second ramp resistor RRMP2 and a second ramp capacitor CRMP2. As shown in FIG. 3, The first ramp resistor RRMP1 and the first ramp capacitor CRMP1 are connected in series between a bias voltage VBIAS and a first voltage potential V1. The second ramp resistor RRMP2 and the second ramp capacitor CRMP2 are connected in series between a common node of the first ramp resistor RRMP1 and the first ramp capacitor CRMP1, and a second voltage potential V2.

In some embodiments, the bias voltage VBIAS is equal to the ground voltage potential (e.g., GND). In alternative embodiments, the bias voltage VBIAS is equal to 1.2 V. It should be noted that the voltages (GND and 1.2 V) described above are merely an example. A person skilled in the art would understand there may be many variations, modifications and alternatives.

In some embodiments, the first voltage potential V1 is the output voltage of the power converter 100. In alternative embodiments, the first voltage potential V1 is equal to the bias voltage VBIAS.

In some embodiments, the second voltage potential V2 is the voltage at the switching node (the common node of Q1 and Q2) of the power converter 100. In alternative embodiments, the second voltage potential V2 is the voltage at an internal switching node of the power converter 100.

The summing stage 204 has four inputs and two outputs. A first input of the summing stage 204 is configured to receive the ramp signal VRAMP. A second input of the summing stage 204 is configured to receive the feedback signal VFB. A third input of the summing stage 204 is configured to receive the control signal VCTRL. A fourth input of the summing stage 204 is configured to receive the reference signal VREF'.

A first adder 210 is configured to receive VRAMP and VFB through a first gain control unit Gm1 and a second gain control unit Gm2 respectively. The VRAMP and VFB signals are converted in their respective current signals, which are added together and applied to a first resistor R1. The voltage across the first resistor R1 is a first output signal of the summing stage 204. As shown in FIG. 3, the voltage at the first output of the summing stage 204 is defined as SUMN.

A second adder 220 is configured to receive VCTRL and VREF' through a third gain control unit Gm3 and a fourth gain control unit Gm4 respectively. The VCTRL and VREF' signals are converted in their respective current signals, which are added together and applied to a second resistor R2. The voltage across the second resistor R2 is a second output signal of the summing stage 204. As shown in FIG. 3, the voltage at the second output of the summing stage 204 is defined as SUMP.

The comparator apparatus 206 is implemented as a comparator. Throughout the description, the comparator apparatus 206 is alternatively referred to as a comparator 206. The comparator 206 has an inverting input connected to the first output (SUMN) of the summing stage 204. The non-inverting input of the comparator 206 is connected to the second output (SUMP) of the summing stage 204.

In some embodiments, the PWM circuit 208 is implemented as an R-S latch as shown in FIG. 3. Throughout the description, the PWM circuit 208 may be alternatively referred to as the latch 208. The set input of the latch 208 is connected to an output of the comparator 206. The reset input of the latch 208 is connected to an output of the on-time control apparatus 214. The outputs of the latch 208 are connected to the gates of the switches Q1 and Q2 through the control logic apparatus 216 and the driver apparatus 218.

The Q output of the latch 208 is connected to the gate of the high-side switch Q1 through the control logic apparatus 216. The output of the control logic apparatus 216 corresponding to the Q output of the latch 208 is HSON. The control logic apparatus 216 generates LSON in accordance with HSON and various other control signals from the control loop.

According to the operating principle of the R-S latch, the output of the comparator 206 determines the turn-on edge or the leading edge of the gate drive signal applied to the high-side switch Q1. The output of the on-time control apparatus 214 determines the turn-off edge or the trailing edge of the gate drive signal applied to the high-side switch Q1.

The on-time control apparatus 214 includes a current source 240, a capacitor Con, a switch Son and a comparator 242. In some embodiments, the current source 240 may be coupled to the input voltage VIN. Furthermore, the current level of the current source 240 is proportional to the input voltage VIN. In some embodiments, the current level of the current source 240 may be equal to the input voltage VIN divided by a predetermined resistor. The voltage across the capacitor Con is fed into a non-inverting input of the comparator 242. The inverting input of the comparator 242 is connected to a predetermined reference Vth. The predetermined reference Vth may be generated based upon the input voltage VIN, the output voltage Vo or a combination of VIN and Vo. For example, the predetermined reference Vth can be proportional to Vo, or proportional to both the switching duty cycle and VIN.

In operation, when the high-side switch Q1 is turned on, a logic level "1" and a logic level "0" are applied to the set input and the reset input of the R-S latch 208 respectively. In response to the logic change at the input of the R-S latch 208, the control logic apparatus 216 generates a logic level "1" at HSON and a logic level "0" at LSON. The logic level "0" at LSON turns off the switch Son. As a result of turning off the switch Son, the current source 240 starts to charge the capacitor Con in a linear manner. The voltage across the capacitor Con is compared with the predetermined reference Vth at the comparator 242. After the voltage across the capacitor Con reaches the voltage of the predetermined reference Vth, the output of the comparator 242 generates a logic level "1" which resets the R-S latch 208 and generates a logic level "0" at the Q output. The logic level "0" at the Q output is used to turn off the high-side switch Q1. Upon turning off the high-side switch Q1, the control logic apparatus 216 generates a logic level "1" at LSON, which turns on the low-side switch Q2. As shown in FIG. 3, the logic level "1" at LSON is also used to turn on the switch Son. The turned-on switch Son discharges the capacitor Con and maintains the voltage across the capacitor Con equal to about zero. As such, the voltage across the capacitor Con is a voltage ramp. This voltage ramp is in sync with the gate drive signal applied to the high-side switch Q1. In other words, the voltage ramp starts from zero and linearly rises during the turn-on time of the high-side switch Q1. The voltage ramp goes back to zero at the trailing edge of the gate drive signal applied to the high-side switch Q1.

Figure 4:
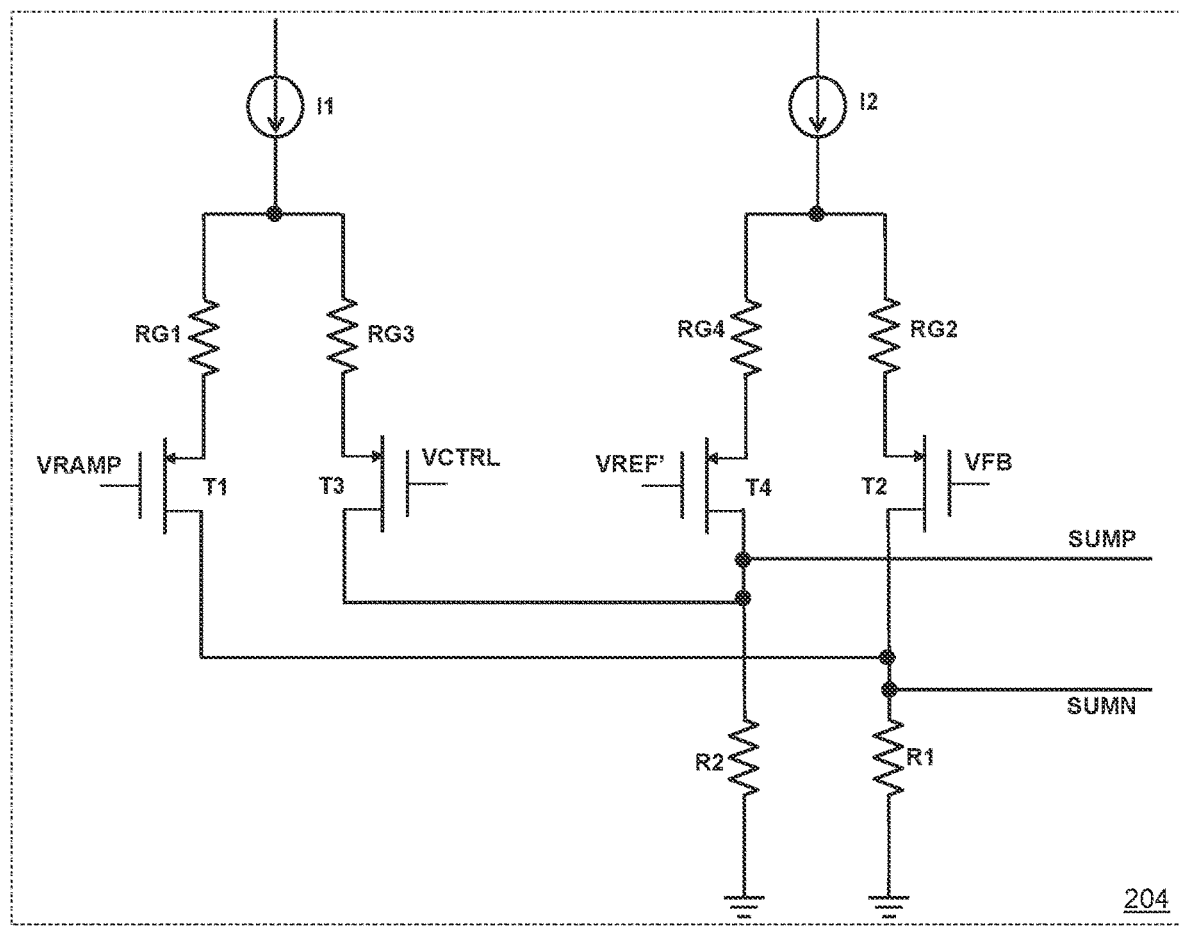
FIG. 4 illustrates a schematic diagram of a first implementation of the summing stage shown in FIG. 3 in accordance with various embodiments of the present disclosure.

FIG. 4 illustrates a schematic diagram of a first implementation of the summing stage shown in FIG. 3 in accordance with various embodiments of the present disclosure. The summing stage 204 has four inputs, namely VRAMP, VFB, VCTRL and VREF', and two outputs, namely SUMP and SUMN. As shown in FIG. 4, a first transistor T1 and a first gain control unit RG1 are connected in series between a first current source I1 and a first output SUMN of the summing stage, 204. The gate of the first transistor is configured to receive the ramp signal VRAMP. The first transistor T1 is a p-type transistor. The source of the first transistor T1 is connected to the first gain control unit RG1. The drain of the first transistor T1 is connected to the first output SUMN. The first gain control unit RG1 is implemented as a resistor as shown in FIG. 4.

As shown in FIG. 4, a second transistor T2 and a second gain control unit RG2 are connected in series between a second current source I2 and the first output SUMN of the summing stage. A gate of the second transistor T2 is configured to receive the feedback signal VFB. A third transistor T3 and a third gain control unit RG3 are connected in series between the first current source I1 and a second output SUMP of the summing stage 204. A gate of the third transistor T3 is configured to receive VCTRL. A fourth transistor T4 and a fourth gain control unit RG4 are connected in series between the second current source I2 and the second output SUMP of the summing stage 204. A gate of the fourth transistor T4 is configured to receive the reference signal VREF'. The transistors T2, T3 and T4 are p-type transistors. The gain control units RG2, RG3 and RG4 are implemented as resistors as shown in FIG. 4.

In operation, the summing stage 204 converts the ramp signal VRAMP and the feedback signal VFB into a ramp current signal and a feedback current signal respectively. The voltage-current conversion gains are controlled by the first gain control unit RG1 and the second gain control unit RG2 respectively. For example, the trans-conductance gain of the ramp signal VRAMP may be increased by reducing the resistance value of the first gain control unit RG1.

The ramp current signal and the feedback current signal are added together. The sum of the ramp current signal and the feedback current signal is applied to the resistor R1 at the first output SUMN. The output signal at the first output SUMN is the sum of the ramp signal VRAMP times a first predetermined gain and the feedback signal VFB times a second predetermined gain.

Likewise, the summing stage 204 converts a control signal VCTRL and a reference signal VREF' into a control current signal and a reference current signal respectively. The voltage-current conversion gains are controlled by the third gain control unit RG3 and the fourth gain control unit RG4 respectively. The control current signal and the reference current signal are added together and applied to the resistor R2 at the second output SUMP. The output signal at the second output SUMP is the sum of the control signal VCTRL times a third predetermined gain and the reference signal VREF' times a fourth predetermined gain.

It should be noted that the voltage-current conversion gains of the control signal VCTRL and the reference signal VREF' may be the same as the voltage-current conversion gains of the ramp signal VRAMP and the feedback signal VFB. Alternatively, depending on different applications and design needs, the voltage-current conversion gains of the control signal VCTRL and the reference signal VREF' may be different from the voltage-current conversion gains of the ramp signal VRAMP and the feedback signal VFB.

Figure 5:
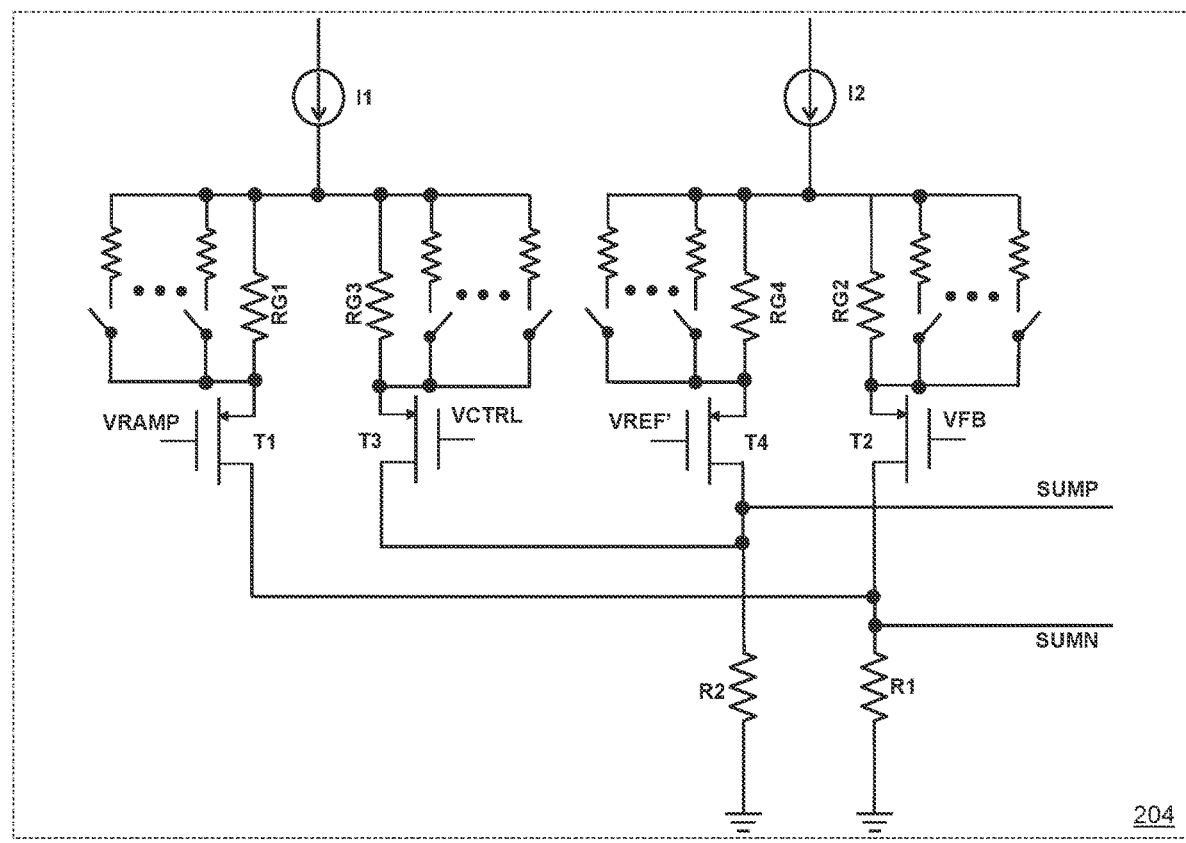
FIG. 5 illustrates a schematic diagram of a second implementation of the summing stage shown in FIG. 3 in accordance with various embodiments of the present disclosure.

FIG. 5 illustrates a schematic diagram of a second implementation of the summing stage shown in FIG. 3 in accordance with various embodiments of the present disclosure. The summing stage 204 shown in FIG. 5 is similar to that shown in FIG. 4 except that the gain control units are formed by a plurality of resistor-switch networks. As shown in FIG. 5, a plurality of first resistor-switch networks is connected in parallel with resistor RG1. The plurality of first resistor-switch networks is configured to dynamically adjust a gain of the first gain control unit.

Likewise, a plurality of second resistor-switch networks is connected in parallel with resistor RG2. The plurality of second resistor-switch networks is configured to dynamically adjust a gain of the second gain control unit. A plurality of third resistor-switch networks is connected in parallel with resistor RG3. The plurality of third resistor-switch networks is configured to dynamically adjust a gain of the third gain control unit. A plurality of fourth resistor-switch networks is connected in parallel with resistor RG4. The plurality of fourth resistor-switch networks is configured to dynamically adjust a gain of the fourth gain control unit.

In some embodiments, the plurality of resistor-switch networks shown in FIG. 5 is implemented as a plurality of binary-weighted resistor-switch networks. For example, the plurality of binary-weighted resistor-switch networks has gain values corresponding to a predetermined number of binary bits having a range from a least significant bit to a most significant bit (e.g., a ratio of $2^n:2^{n-1} \ldots 4:2:1$).

One advantageous feature of having the adjustable gain control units shown in FIG. 5 is the control signals such as the ramp signal VRAMP can be adjusted under different operating conditions. Such an adjustable ramp helps to improve the performance of the power converter 100. For example, with the adjustable ramp, the power converter 100 is able to achieve both stable operations and fast transient responses under various operation conditions.

Figure 11:
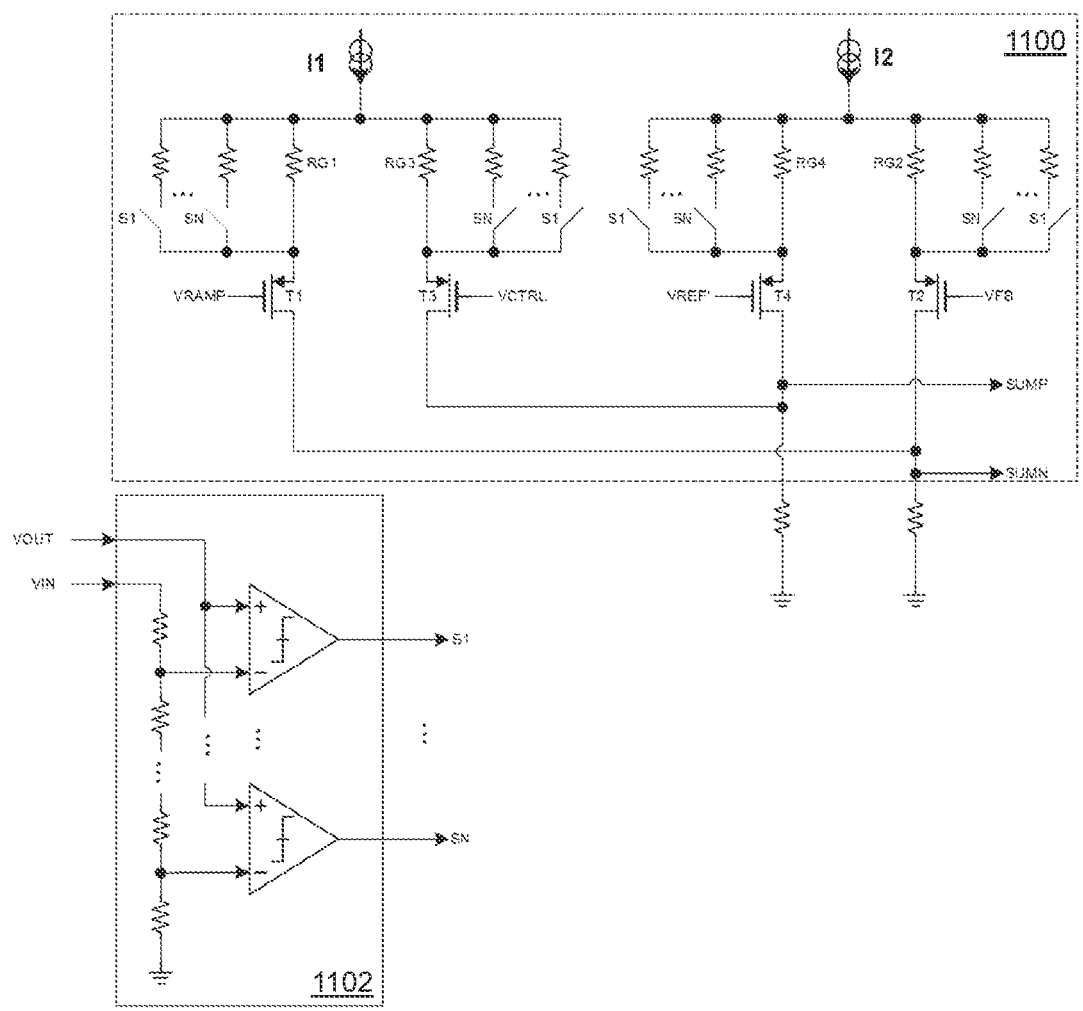
FIG. 11 illustrates a schematic diagram of a controller for achieving adjustable gains in accordance with various embodiments of the present disclosure.

FIG. 11 is an example of the adjustable gain control of the summing stage where the gain control switches are chosen based on the duty cycle of the power converter 100. The duty cycle detector block comprises an array of comparators, a series of threshold voltages divided from VIN, and a decoder to decode the comparator outputs to determine the duty cycle level of the power converter 100. The decoder outputs (S1 through SN) drive the gain control switches of the summing stage to choose an appropriate gain based upon the detected duty cycle level.

Figure 6:
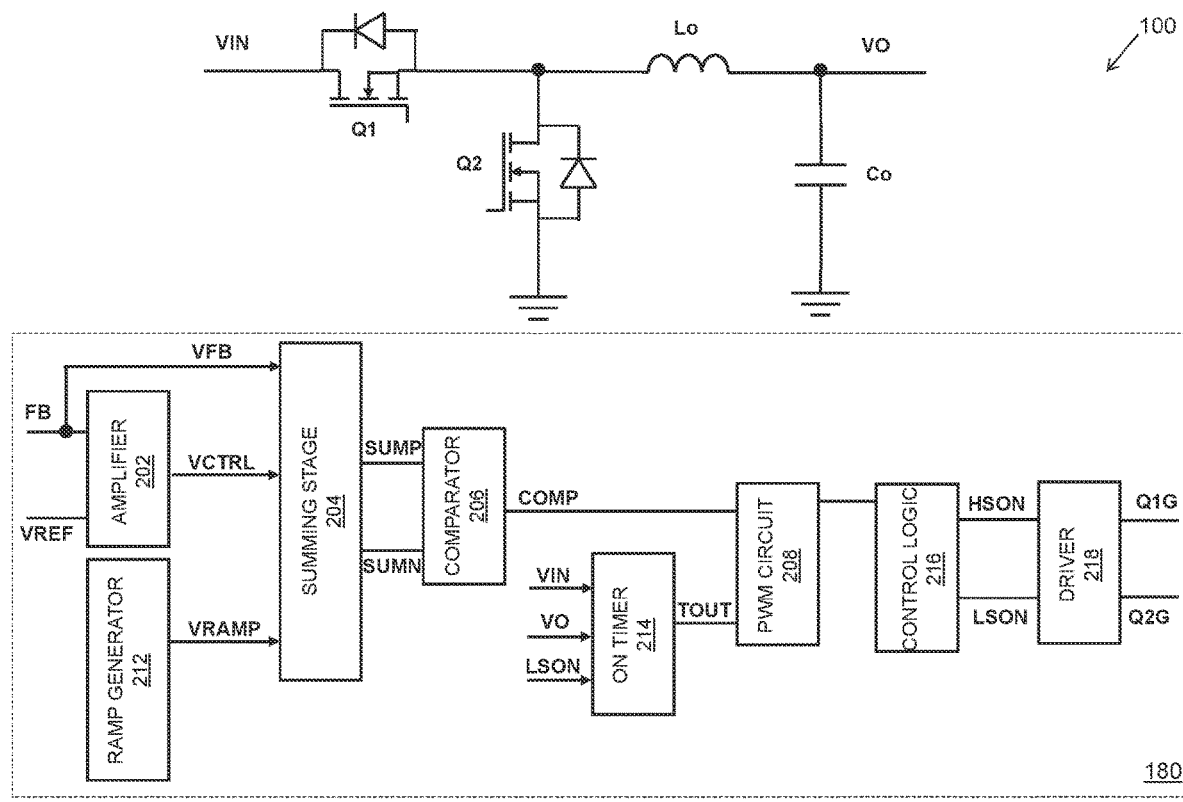
FIG. 6 illustrates a detailed block diagram of a second implementation of the control apparatus of the power converter shown in FIG. 1 in accordance with various embodiments of the present disclosure.

FIG. 6 illustrates a detailed block diagram of a second implementation of the control apparatus of the power converter shown in FIG. 1 in accordance with various embodiments of the present disclosure. The control apparatus 180 shown in FIG. 6 is similar to that shown in FIG. 2 except that the reference signal VREF' is not fed into the summing stage 204. Since the structure of the control apparatus 180 has been discussed in detail with respect to FIG. 2, it is not discussed herein to avoid repetition.

Figure 7:
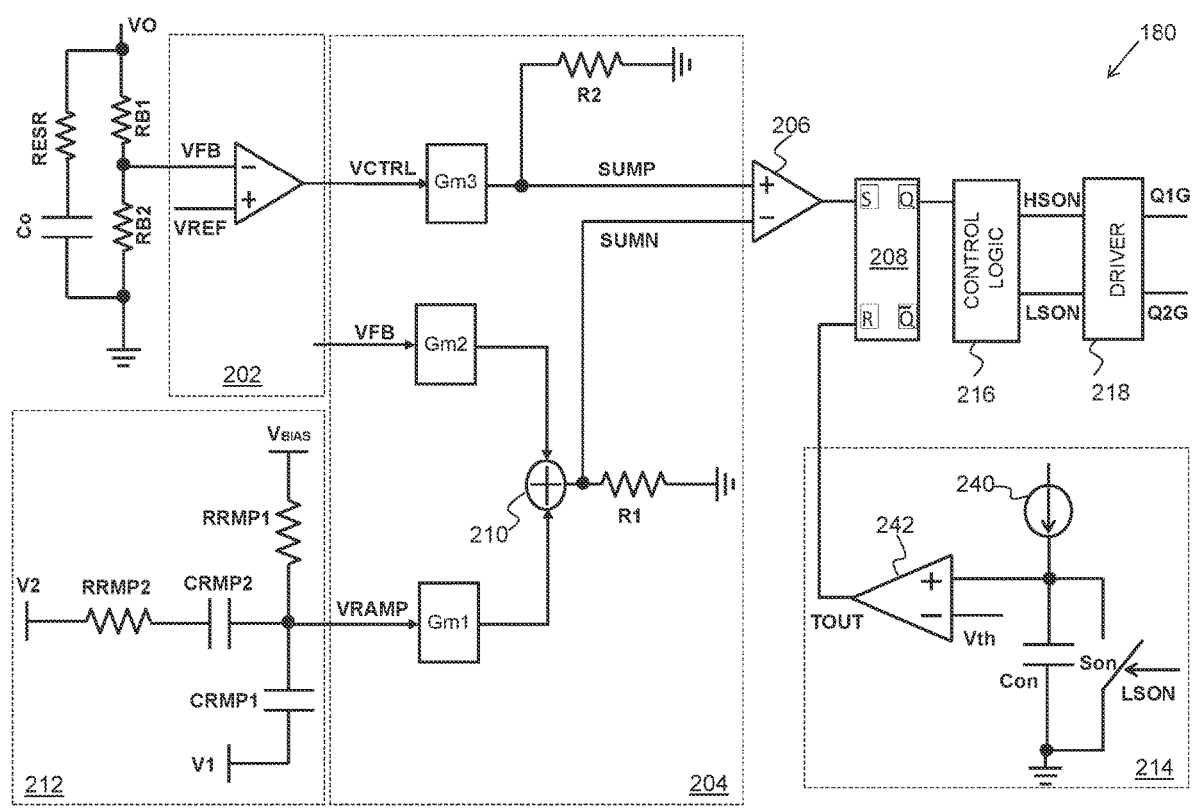
FIG. 7 illustrates a schematic diagram of the control apparatus shown in FIG. 6 in accordance with various embodiments of the present disclosure.

FIG. 7 illustrates a schematic diagram of the control apparatus shown in FIG. 6 in accordance with various embodiments of the present disclosure. The control apparatus 180 shown in FIG. 7 is similar to that shown in FIG. 3, and hence is not discussed in further detail to avoid repetition.

Figure 8:
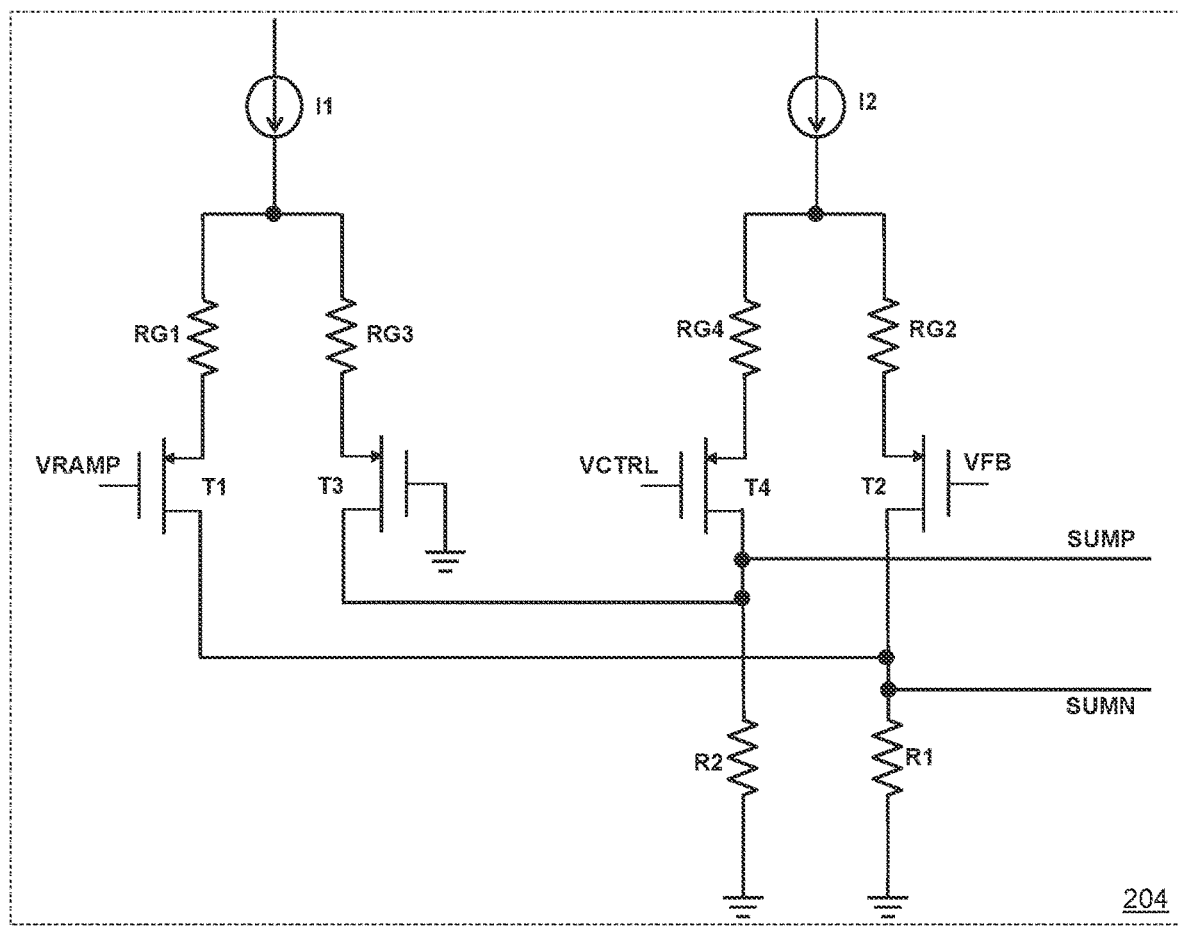
FIG. 8 illustrates a schematic diagram of a first implementation of the summing stage shown in FIG. 7 in accordance with various embodiments of the present disclosure.

FIG. 8 illustrates a schematic diagram of a first implementation of the summing stage shown in FIG. 7 in accordance with various embodiments of the present disclosure. The summing stage 204 shown in FIG. 8 is similar to that shown in FIG. 4 except that the gate of the fourth transistor T4 is connected to VCTRL instead, and the gate of the third transistor T3 is connected to ground. Since the structure of the summing stage 204 has been discussed in detail with respect to FIG. 4, it is not discussed herein to avoid repetition.

Figure 9:
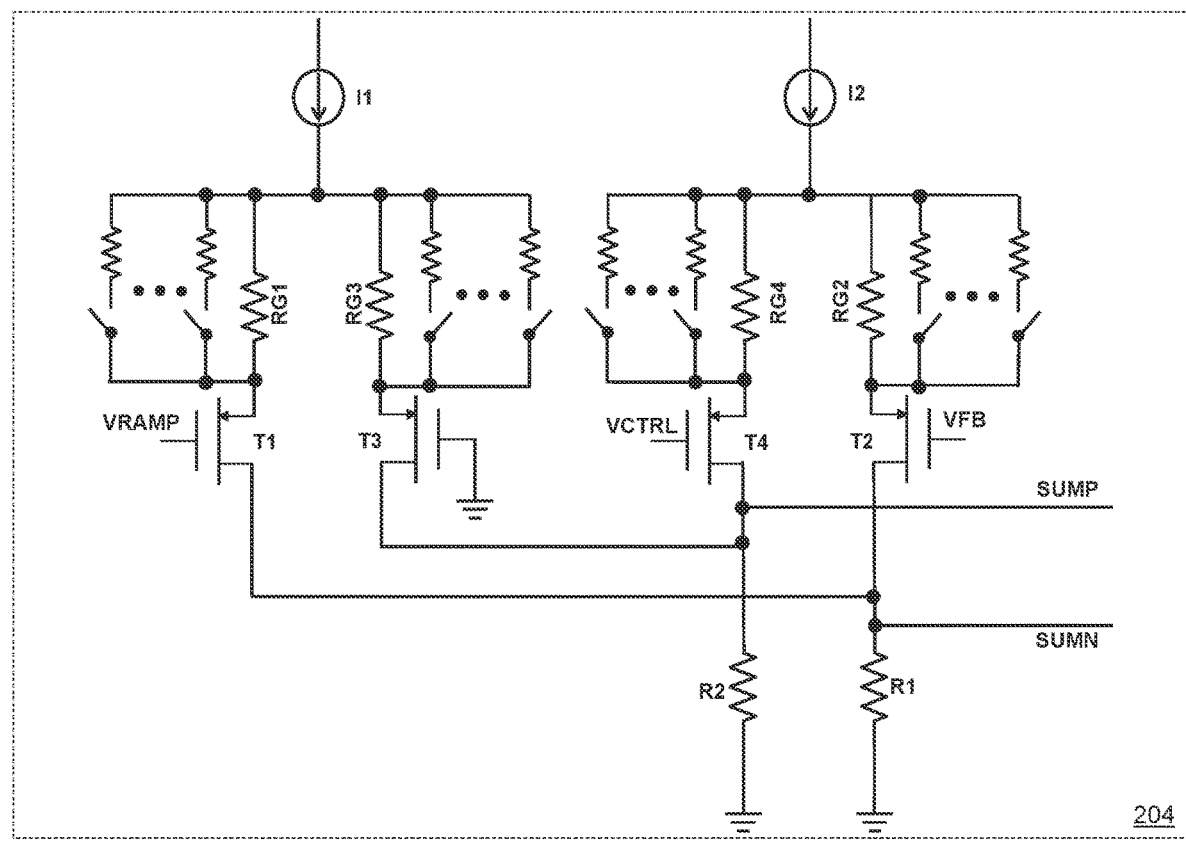
FIG. 9 illustrates a schematic diagram of a second implementation of the summing stage shown in FIG. 7 in accordance with various embodiments of the present disclosure.

FIG. 9 illustrates a schematic diagram of a second implementation of the summing stage shown in FIG. 7 in accordance with various embodiments of the present disclosure. The summing stage 204 shown in FIG. 9 is similar to that shown in FIG. 5, and hence is not discussed in further detail to avoid repetition.

Figure 10:
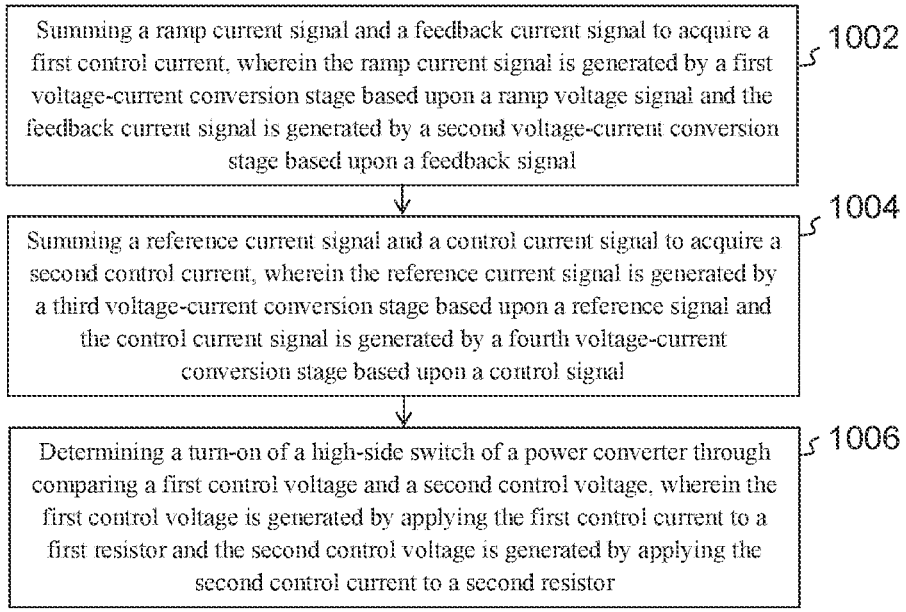
FIG. 10 illustrates a flow chart of a method for controlling the power converter shown in FIG. 1 in accordance with various embodiments of the present disclosure.

FIG. 10 illustrates a flow chart of a method for controlling the power converter shown in FIG. 1 in accordance with various embodiments of the present disclosure. This flowchart shown in FIG. 10 is merely an example, which should not unduly limit the scope of the claims. One of ordinary skill in the art would recognize many variations, alternatives, and modifications. For example, various steps illustrated in FIG. 10 may be added, removed, replaced, rearranged and repeated.

A power converter comprises a high-side switch and a low-side switch connected in series between an input power source and ground. The power converter further comprises an inductor connected between a common node of the high-side switch and the low-side switch, and an output capacitor. The power converter is controlled by a constant on-time control scheme. The turn-on of the high-side switch of the power converter is controlled by an output of a comparator. The turn-off of the high-side switch is controlled by a predetermined on timer. The inputs of the comparator are connected to the outputs of a summing stage.

At step 1002, a ramp current signal and a feedback current signal are added together to acquire a first control current. The ramp current signal is generated by a first voltage-current conversion stage based upon a ramp voltage signal and the feedback current signal is generated by a second voltage-current conversion stage based upon a feedback signal. The first control current is applied to a first resistor. As a result of applying the first control current to the first resistor, a first control voltage is generated at a first output of a summing stage.

At step 1004, a reference current signal and a control current signal are added together to acquire a second control current. The reference current signal is generated by a third voltage-current conversion stage based upon a reference signal and the control current signal is generated by a fourth voltage-current conversion stage based upon a control signal. The control signal is an output signal of an error amplifier. The second control current is applied to a second resistor. As a result of applying the second control current to the second resistor, a second control voltage is generated at a second output of the summing stage.

At step 1006, the first control voltage and the second control voltage generated by the summing stage are compared at a comparator. The turn-on of the high-side switch of the power converter is determined by the output signal of the comparator. The turn-off of the high-side switch of the power converter is determined by the output signal of the predetermined on timer.

FIG. 11 illustrates a schematic diagram of a controller for achieving adjustable gains in accordance with various embodiments of the present disclosure. A summing stage 1100 includes a plurality of adjustable gain control units. The structure and operating principle of a summing stage having a plurality of adjustable gain control units have been described in detail above with respect to FIG. 5, and hence are discussed again to avoid unnecessary repetition.

A controller 1102 is employed to control the on/off the switches (e.g., S1 to SN) of the summing stage 1100. As shown in FIG. 11, the controller 1102 is configured to receive a plurality of operating parameters such as VIN and VOUT. The controller 1102 comprises an array of comparators, a series of threshold voltages divided from VIN, and a decoder to decode the comparator outputs to determine the duty cycle level of the power converter 100. The outputs of the controller 1102 are used to drive the switches (e.g., S1 to SN) of the summing stage 1100 so as to obtain an appropriate gain based upon the detected duty cycle level.

It should be recognized that while FIG. 11 illustrates one controller, the summing stage could accommodate any number of controller. More particularly, there may be four controllers for controlling the operation of the four adjustable gain control units. Alternatively, these four controllers may be integrated into one single controller.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
   a first conversion unit configured to convert a ramp voltage signal into a ramp current signal flowing through a first resistor;
   a second conversion unit configured to convert a feedback voltage signal into a feedback current signal flowing through the first resistor, wherein the feedback voltage signal is proportional to an output voltage of the power converter;
   a third conversion unit configured to convert a control voltage signal generated by an error amplifier into a control current signal flowing through a second resistor; and
   a comparator having a first input coupled to the first resistor and a second input coupled to the second resistor, wherein an output of the comparator determines a turn-on of a high-side switch of a power converter.

2. The apparatus of claim 1, wherein:
the first input of the comparator is an inverting input, and wherein the first resistor is connected between the inverting input of the comparator and ground; and
the second input of the comparator is a non-inverting input, and wherein the second resistor is connected between the non-inverting input of the comparator and ground.

3. The apparatus of claim 1, further comprising:
a fourth conversion unit configured to convert a reference voltage signal into a reference current signal flowing through the second resistor.

4. The apparatus of claim 3, wherein:
the reference voltage signal is proportional to a reference of the error amplifier.

5. The apparatus of claim 3, wherein:
the first conversion unit comprising a first transistor and a first gain control resistor connected in series between a first current source and the first resistor, and wherein a gate of the first transistor is configured to receive the ramp voltage signal;
the second conversion unit comprising a second transistor and a second gain control resistor connected in series between a second current source and the first resistor, and wherein a gate of the second transistor is configured to receive the feedback voltage signal;
the third conversion unit comprising a third transistor and a third gain control resistor connected in series between the first current source and the second resistor, and wherein a gate of the third transistor is configured to receive the control voltage signal; and
the fourth conversion unit comprising a fourth transistor and a fourth gain control resistor connected in series between the second current source and the second resistor, and wherein a gate of the fourth transistor is configured to receive the reference voltage signal.

6. The apparatus of claim 5, further comprising:
a plurality of first resistor-switch networks connected in parallel with the first gain control resistor, wherein the plurality of first resistor-switch networks is configured to dynamically adjust a gain of the first conversion unit;
a plurality of second resistor-switch networks connected in parallel with the second gain control resistor, wherein the plurality of second resistor-switch networks is configured to dynamically adjust a gain of the second conversion unit;
a plurality of third resistor-switch networks connected in parallel with the third gain control resistor, wherein the plurality of third resistor-switch networks is configured to dynamically adjust a gain of the third conversion unit; and
a plurality of fourth resistor-switch networks connected in parallel with the fourth gain control resistor, wherein the plurality of fourth resistor-switch networks is configured to dynamically adjust a gain of the fourth conversion unit.

7. The apparatus of claim 1, wherein:
the power converter is a buck converter.

8. The apparatus of claim 1, further comprising:
an on timer configured to receive a plurality of operating parameters, and generate a turn-off signal of the high-side switch based on the plurality of operating parameters.

9. The apparatus of claim 8, further comprising:
a latch circuit have a set input connected to the output of the comparator, a reset input connected to an output of the on timer, and an output configured to generate a PWM signal for the high-side switch.

10. An apparatus comprising:
a first adjustable gain conversion unit configured to convert a ramp voltage signal into a ramp current signal flowing through a first resistor;
a second adjustable gain conversion unit configured to convert a feedback voltage signal into a feedback current signal flowing through the first resistor;
a third adjustable gain conversion unit configured to convert a control voltage signal generated by an error amplifier into a control current signal flowing through a second resistor; and
a comparator having a first input coupled to the first resistor and a second input coupled to the second resistor, wherein an output of the comparator determines a turn-on of a high-side switch of a power converter.

11. The apparatus of claim 10, further comprising:
a fourth adjustable gain conversion unit configured to convert a reference voltage signal into a reference current signal flowing through the second resistor.

12. The apparatus of claim 10, wherein the first adjustable gain conversion unit comprises:
a first transistor and a first gain control resistor connected in series between a first current source and the first resistor; and
a plurality of first resistor-switch networks connected in parallel with the first gain control resistor.

13. The apparatus of claim 12, wherein:
the plurality of first resistor-switch networks is configured to dynamically adjust a gain of the first adjustable gain conversion unit.

14. The apparatus of claim 10, wherein the power converter is a step-down converter comprising:
the high-side switch and a low-side switch connected in series; and
an inductor connected to a common node of the high-side switch and the low-side switch.

15. A converter comprising:
a high-side switch and a low-side switch connected in series between an input power source and ground;
an inductor connected between a common node of the high-side switch and the low-side switch, and an output capacitor; and
a control apparatus comprising:
a first conversion unit configured to convert a ramp voltage signal generated by a ramp generator into a ramp current signal flowing through a first resistor;
a second conversion unit configured to convert a feedback voltage signal into a feedback current signal flowing through the first resistor, wherein the feedback voltage signal is proportional to an output voltage of the converter;
a third conversion unit configured to convert a control voltage signal generated by an error amplifier into a control current signal flowing through a second resistor; and
a comparator having a first input coupled to the first resistor and a second input coupled to the second resistor, wherein an output of the comparator determines a turn-on of the high-side switch of a power converter.

16. The converter of claim 15, wherein:
the feedback voltage signal is generated by a resistor divider connected between a positive terminal of the output capacitor and ground; and the ramp generator comprises:
- a first ramp resistor and a first ramp capacitor connected in series between a first voltage potential and a second voltage potential, and wherein the ramp voltage signal is generated across the first ramp capacitor; and
- a second ramp resistor and a second ramp capacitor connected in series between a common node of the first ramp resistor and the first ramp capacitor, and a third voltage potential.

17. The converter of claim 15, further comprising:
a fourth conversion unit configured to convert a reference voltage signal into a reference current signal flowing through the second resistor, wherein the reference voltage signal is proportional to a reference of the error amplifier.

18. The converter of claim 17, wherein:
- the first conversion unit comprising a first transistor and a first gain control resistor connected in series between a first current source and the first resistor, and wherein a gate of the first transistor is configured to receive the ramp voltage signal;
- the second conversion unit comprising a second transistor and a second gain control resistor connected in series between a second current source and the first resistor, and wherein a gate of the second transistor is configured to receive the feedback voltage signal;
- the third conversion unit comprising a third transistor and a third gain control resistor connected in series between the first current source and the second resistor, and wherein a gate of the third transistor is configured to receive the control voltage signal; and
- the fourth conversion unit comprising a fourth transistor and a fourth gain control resistor connected in series between the second current source and the second resistor, and wherein a gate of the fourth transistor is configured to receive the reference voltage signal.

19. The converter of claim 15, further comprising:
- an on-time control generator configured to generate a turn-off signal of the high-side switch; and
- a latch having a set input configured to receive an output signal of the comparator and a reset input configured to receive an output signal of the on-time control generator, wherein the latch is configured to generate a PWM signal for the high-side switch.

* * * * *